US005941257A

United States Patent [19]

Gruszczynski, II

[11] Patent Number: 5,941,257

[45] Date of Patent: Aug. 24, 1999

[54] METHOD FOR TWO-PHASE FLOW HYDRODYNAMIC CLEANING FOR PIPING SYSTEMS

[75] Inventor: David W. Gruszczynski, II, Rochester, N.Y.

[73] Assignee: Eastman Kodak Company, Rochester, N.Y.

[21] Appl. No.: 08/929,322

[22] Filed: Sep. 12, 1997

[51] Int. Cl.$^{6}$ .................................. B08B 9/06; G05D 3/12

[52] U.S. Cl. .................................. 134/22.11; 134/22.12; 134/36; 73/861.04; 364/510

[58] Field of Search .............................. 134/22.11, 22.12, 134/22.15, 22.16, 24, 30, 34, 36, 37; 73/861.04, 198; 364/509, 510

[56] References Cited

U.S. PATENT DOCUMENTS

| | | | |
|---|---|---|---|
| 3,180,759 | 4/1965 | Falk | 134/22.12 |
| 3,350,223 | 10/1967 | Monteath, Jr. | 134/22.17 |
| 4,096,745 | 6/1978 | Rivkin et al. | 73/861.04 |
| 4,161,979 | 7/1979 | Stearns | 165/95 |
| 4,320,665 | 3/1982 | Cain | 73/861.04 |
| 4,419,141 | 12/1983 | Kunkel | 134/22.12 |
| 4,608,018 | 8/1986 | Ghedini et al. | 433/88 |
| 4,655,846 | 4/1987 | Scharton et al. | 134/1 |
| 4,817,439 | 4/1989 | Arnaudeau et al. | 73/861.04 |
| 5,087,294 | 2/1992 | Rechtzigel | 134/22.12 |
| 5,127,961 | 7/1992 | Aiton | 134/22.12 |
| 5,423,917 | 6/1995 | Garcia, Jr. | 134/22.12 |

OTHER PUBLICATIONS

Robert H. Nunn, Intermediate Fluid Mechanics, "Turbulent Flows", 1989, pp. 235–255.

Vestnik Mashinostroeniya, vol. 61, Issue 10, 1981, "An Estimate of the Efficiency with Which The Internal Chambers of Parts are Cleansed with A Pulsating Flow", pp. 33–35.

Vestnik Mashinostroeniya, vol. 65, Issue 11, 1985, "Investigation and Calculation of the Process of Cleaning Pipes by a Pulsating Flow of Liquid", pp. 19–21.

B.S. Shiralkar, "Two–Phase Flow and Heat Transfer in Multirod Geometries: A Study of the Liquid Film in Adiabatic Air–Water Flow with and without Obstacles", pp. iii/iv–68, 1970.

Kim, H.T., Kline, S.J. Reynolds, W.C., J. Fluid Mechanics, vol. 50, "The Production of Turbulence Near a Smooth Wall in a Turbulent Boundary Layer", pp. 133–160 and associated figures, 1970.

J. Visser, "Adhesion and Removal of Particles I", 1988, pp. 87–103.

J. Visser, "Adhesion and Removal of Particles II", 1988, pp. 105–123.

Christian Tradardh and Irene VonBockelmann, "Mechanical Cleaning Effect and Pressure Drop of Air–Water–Flow in Horizontal Glass Tubes (Vacuum Dairy Pipelines)", 1980, pp. 77–89.

Gad Hetsroni, *Handbook of Multiphase Systems*, 1982, pp. vii through 2–62.

Joseph H. Haritonidis, "The Measurement of Wall Shear Stress", Advances in Fluid Mechanics Measurements, Lecture Notes in Engineering, (ed. M. Gad–el–Hak), 1989, pp. 229–261.

G.F. Hewitt, Measurement of Two Phase Flow Parameters, 1978a, pp. 162–165 and 194 and 195.

J.W. Cleaver, B. Yates, Journal of Colloid and Interface Sci., vol. 44, pp. 464–474, 1973.

*Primary Examiner*—Jill Warden
*Assistant Examiner*—Saeed Chaudhey
*Attorney, Agent, or Firm*—Mark G. Bocchetti

[57] ABSTRACT

A method for hydrodynamic cleaning of a piping system using two-phase flow. A model for predicting peak wall shear stress for two-phase flow is used to determine an optimum flow rate ratio which achieves a maximum wall shear stress in the particular piping system to be cleaned. The optimum flow rate is first established by turning on the liquid and gas flows through the piping system to be cleaned and allowing the flow to reach steady state conditions. The back pressure of the system is measured and the optimization model is used to determine the optimum flow rate ratio. Once the optimum flow rate ratio has been calculated, the liquid flow rate and the gas flow rates can be adjusted such that the optimum ratio is achieved. The two-phase back pressure is then measured to verify that the optimum flow rate ratio has been used. This is done by comparing the measured optimum two-phase flow back pressure with the initial two-phase back pressure used in the equations. If there is a variance between the two back pressures then the measured back pressure is substituted into the equations for the initial back pressure and the optimum flow rate ratio is recalculated. This step is repeated until the measured back pressure is equal to the back pressure used in the calculations. Cleaning is then performed at that optimum flow rate ratio.

19 Claims, 14 Drawing Sheets

METHOD FOR TWO-PHASE FLOW HYDRODYNAMIC CLEANING FOR PIPING SYSTEMS

FIELD OF THE INVENTION

This invention relates generally to methods for cleaning piping systems and, more particularly, to methods for optimizing two-phase flow for hydrodynamic cleaning of piping systems.

BACKGROUND OF THE INVENTION

Several different techniques have been used in order to clean the interior of piping systems. These clean-in-place techniques include pigging, brush cleaning, lances and fluid flow or hydrodynamic cleaning. Pigging and brush cleaning require direct physical contact of a tool with the interior of the pipe. Pigging, brush cleaning and lance cleaning techniques can all be time consuming and require special equipment. For that reason, hydrodynamic cleaning is generally the method of choice for cleaning operations which require quick turn around time and/or relatively low cost.

In the case of single-phase flow of liquids for hydrodynamic cleaning, high liquid flow rates are needed to achieve effective cleaning. The resulting flow is not particularly efficient for cleaning and is wasteful in terms of the volume of liquid used for cleaning. Through the use of two-phase flow in cleaning operations, the amount of liquid waste is decreased and a more efficient hydrodynamic cleaning is accomplished. However, improper application of two-phase flow in cleaning operations can also result in an ineffective cleaning or even in a compounding of the cleaning problem. If the gas flow used in the two-phase flow is insufficient, the flow will more resemble a single-phase flow and, thus, the cleaning will be insufficient. If too much gas flow is used in a two-phase flow cleaning operation, there is the potential of that the fouling within the piping will be dried and hardened making it more difficult to remove.

Two-phase flow for use in cleaning operations is known. One example is taught in U.S. Pat. No. 4,161,979 to Stearns. Stearns actually teaches a method for flushing an automobile cooling system using a mixture of water and pressurized air. Although Stearns teaches gauges and valves in order to monitor and control the flow rates of air and water to the mixing chamber, he does not seem to suggest any particular air/water ratio regardless of the system being cleaned.

In an article entitled “Mechanical Cleaning Effect and Pressure Drop of Air-Water-Flow in Horizontal Glass Tubes (Vacuum Dairy Pipelines)” which appeared in a 1980 issue of Journal of Food Process Engineering 3, mathematical models were presented for calculating pressure drop and mechanical cleaning effect for plant design of vacuum dairy milking pipes. In such article, two-phase flow was reviewed for its ability to clean glass tubes. The two-phase flow was generated with the aid of a vacuum system. Water was pumped into the piping system and air was drawn through with the vacuum system, with both flows being controlled by valves. Tradardh and VonBockelmann, authors of the article, correlated their cleaning results to that of the predicted two-phase pressure drop, using the Dukler Homogeneous Pressure Drop Model. In this correlation, the slopes of the constant cleaning effect curves were related to the constant pressure drop curves. By this approach it was shown that the slopes were nearly identical for annular flow (high air to water flow ratios) and the slopes began to deviate in the slug flow regime (low air to water flow ratios). It was concluded that at low air fractions, that is, low air to water ratios, there was an increase in the pressure gradient but there was not a corresponding increase in cleaning efficiency. Alternatively, with high air fractions there was both an increase in pressure gradient and an increase in cleaning efficiency. Thus, such article concludes that cleaning efficiency increased with both pressure and flow rate ratio.

The prior art fails to recognize in that for cleaning efficiency, there is an optimum flow rate ratio for any particular piping system. The prior art fails to teach any method for arriving at this optimum flow rate ratio and further fails to recognize that cleaning efficiency resulting from two-phase flow may vary at different points within the piping system.

SUMMARY OF THE INVENTION

It is, therefore, an object of the present invention to provide and improve two-phase flow cleaning process for cleaning piping systems.

It is a further object of the present invention to provide a model through which a user can predict the optimum flow rate ratio to perform two-phase hydrodynamic cleaning of a piping system.

Briefly stated, these and numerous other features, objects and advantages of the present invention will become readily apparent upon a review of the detailed description, claims and drawings set forth herein. These features, objects and advantages are accomplished by providing a method and model for predicting the optimum two-phase flow for hydrodynamic cleaning of a particular piping system. The optimum flow rate is first established by turning on the liquid and gas flows through the piping system to be cleaned and allowing the flow to reach steady state conditions. The back pressure of the system is measured and the optimization model is used to determine the optimum flow rate ratio. Once the optimum flow rate ratio has been calculated, the liquid flow rate and the gas flow rates can be adjusted such that the optimum ratio is achieved. The two-phase back pressure is then measured to verify that the optimum flow rate ratio has been used. This is done by comparing the measured optimum two-phase flow back pressure with the initial two-phase back pressure used in the equations. If there is a variance between the two back pressures then the measured back pressure is substituted into the equations for the initial back pressure and the optimum flow rate ratio is recalculated. This step is repeated until the measured back pressure is equal to the back pressure used in the calculations. Cleaning is then performed at that optimum flow rate ratio.

DETAILED DESCRIPTION OF THE INVENTION

Cleaning of fouling from piping systems is actually a function of both the solubility of the fouling in the cleaning solvent and the force applied to remove the fouling. By eliminating the solubility aspect of cleaning, a direct correlation can be made between cleaning efficiency and wall shear stress. As such, the terms "cleaning efficiency" and "wall shear stress" are used interchangeably herein. The examples described hereinafter in the practice of the method of the present invention were conducted in such a manner so as to eliminate solubility of the fouling as a factor in cleaning.

As mentioned above, hydrodynamic cleaning with a single-phase flow requires high liquid flow rates to achieve efficient cleaning. The resulting flow is not efficient for cleaning and is further wasteful in terms of the volume of liquids used. Utilization of two-phase flow for cleaning can reduce the amount of liquid waste and generate more efficient hydrodynamic cleaning. However, improper application of two-phase flow cleaning can produce different problems as well as result in insufficient cleaning.

Figure 1:
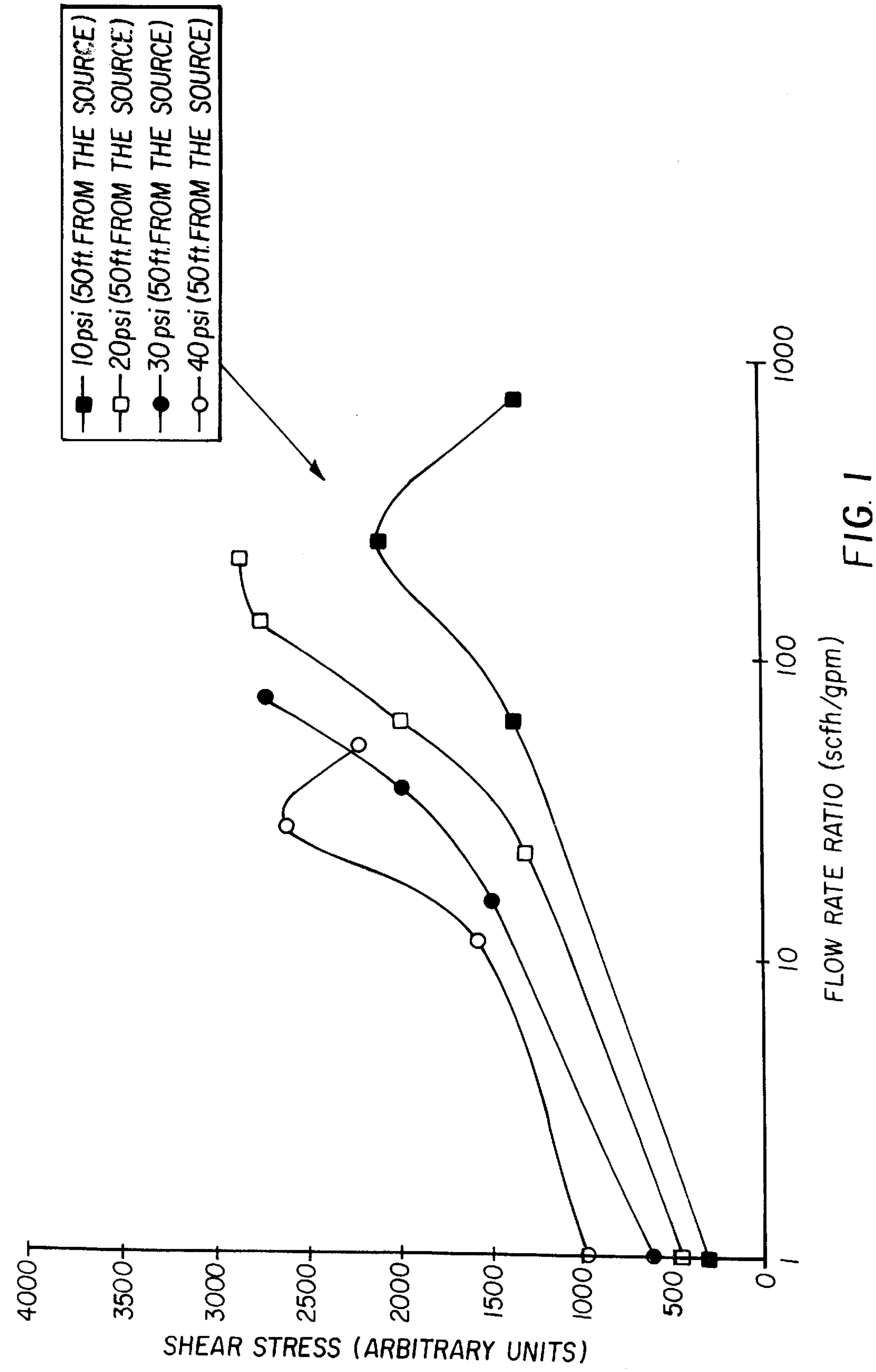
FIG. 1 is a graph plotting wall shear stress in arbitrary units versus flow rate ratio to demonstrate two-phase flow hydrodynamic cleaning effect in piping having a 0.62 inch inside diameter at different pressures and at a distance of 50 feet from the source.

Through the practice of the method of the present invention, two-phase hydrodynamic cleaning of stationary piping systems can be optimized. Optimization of the liquid and gas flow rates for hydrodynamic cleaning is accomplished through experimental and semi-analytical analysis of two-phase flow in tubular geometry. In the experimental analysis, the cleaning efficiency of two-phase flow was measured at different flow rates for different system configurations. The data demonstrates that there is a maximum cleaning efficiency with respect to the ratio of air and water volumes. This data is presented in FIG. 1 which is a graph plotting shear stress in arbitrary units versus the flow rate ratio (scfh/gpm). The data presented in FIG. 1 was collected for a piping system comprised of ⅝" diameter pipe with actual measurement occurring at 50 feet from the source of the two-phase flow entrance into the piping system. The data further demonstrates that the maximum cleaning efficiency changes with different system back pressures. Thus, optimum flow rate ratio is dependent on system back pressure. The experimental data shows that at flow rate ratios higher than the optimum ratio, the cleaning efficiency decreases. This result is contrary to the results shown in the Tragardh and VonBockelmann article which appeared in the 1980 issue of the Journal of Food Process Engineering 3. Tragardh and VonBockelmann had concluded that cleaning efficiency increases with flow rate ratio.

Figure 2:
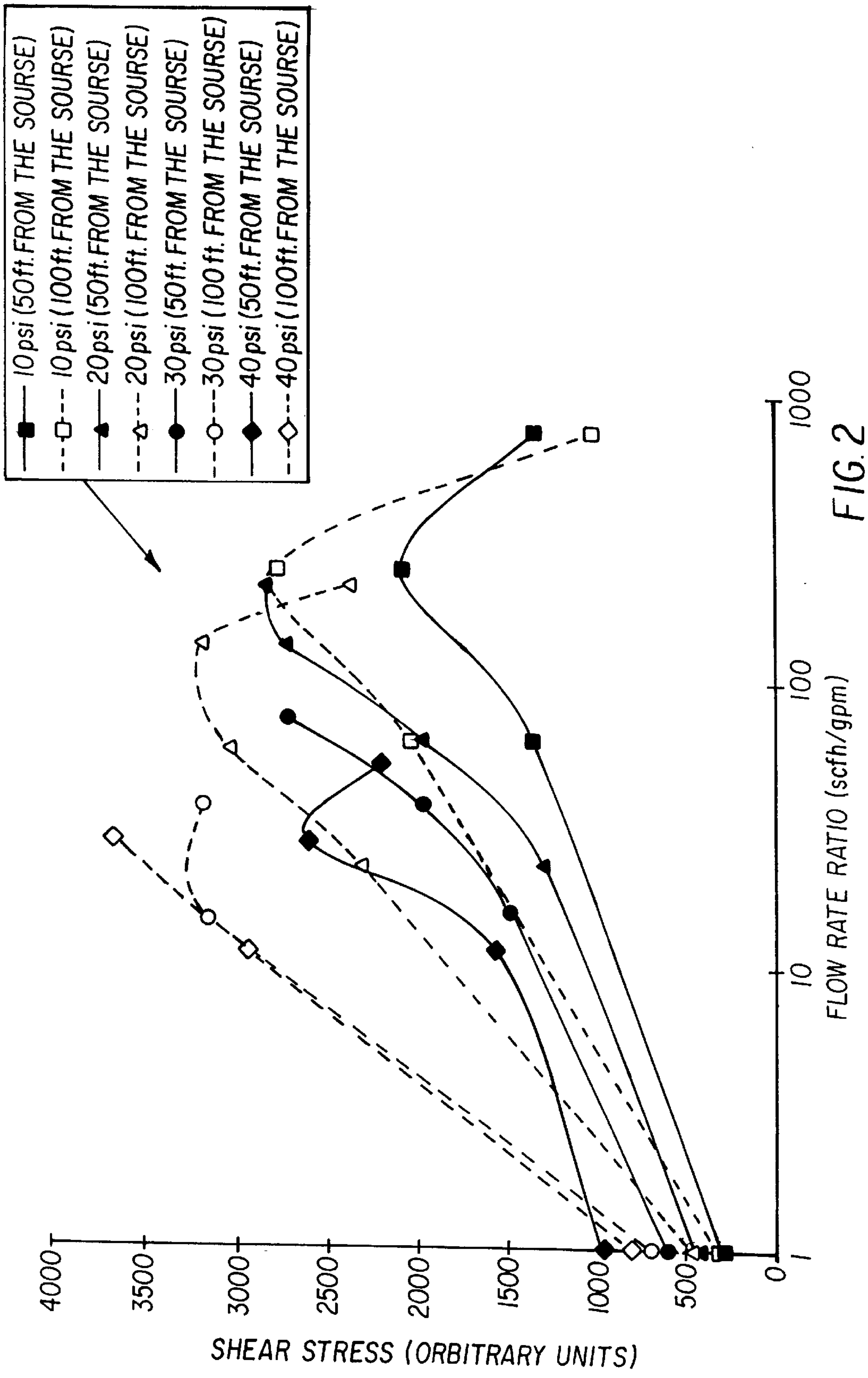
FIG. 2 is a graph plotting wall shear stress in arbitrary units versus flow rate ratio to demonstrate two-phase flow hydrodynamic cleaning effect in piping having a 0.62 inch inside diameter at different pressures and at a distance of 50 feet and 100 feet from the source.

Wall shear stress was measured at several locations along the length of the process piping. The results of those measurements at a distance of 100 feet from the cleaning source (the point of entry into the piping system of the two-phase flow) are shown in FIG. 2 along with data collected at 50 feet from the cleaning source. FIG. 2 shows that the trends are the same for both set of data. That is, optimum flow rate ratio decreases with an increase in system pressure. However, another interesting result was also discovered. The cleaning efficiency (wall shear stress) at the end of the piping system, that is the data collected at 100 feet from the source, is greater than the cleaning efficiency (wall shear stress) nearer the source (50 feet from the source).

Figure 3:
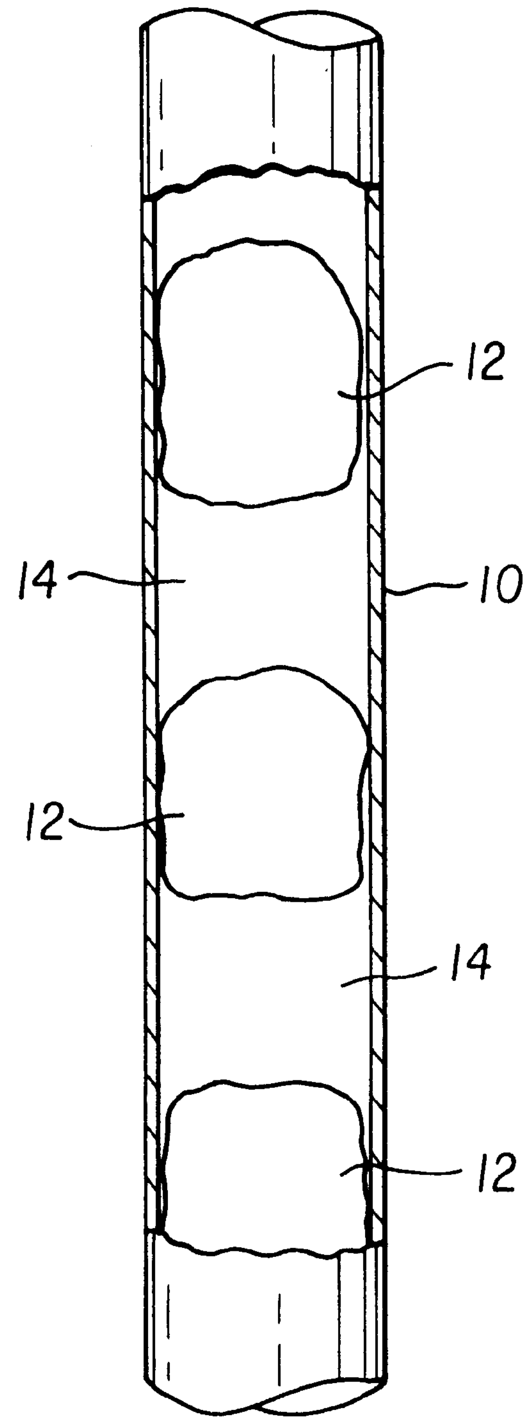
FIG. 3 is a cross-sectional view of a portion of a pipeline having a two-phase slug flow being transmitted therethrough.
Figure 4:
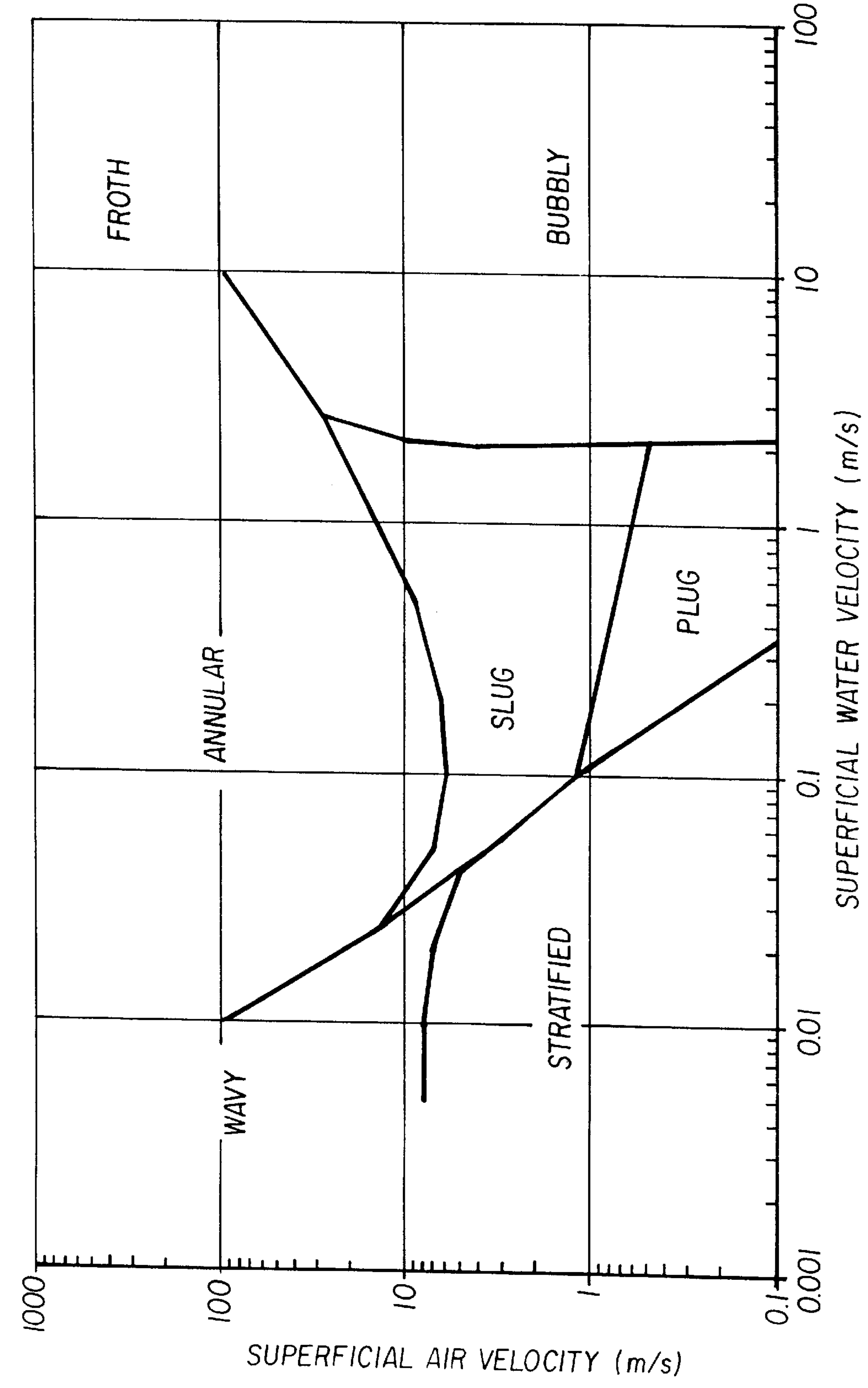
FIG. 4 is a graph (from Handbook of Multiphase Systems by G. Hestroni) of the horizontal two-phase flow map for air and water flow plotting superficial air velocity versus superficial water velocity.

An increase in cleaning efficiency at a distance further from the cleaning source is not intuitive. The two-phase flow used for cleaning typically exists in what is known as the slug flow regime. Slug or plug flow is depicted in FIG. 3 which shows a section of pipe 10 with slugs or plugs of water 12 separated by intermediate zones 14 of pressurized gas. The graph presented in FIG. 4 is a horizontal two-phase flow regime map for air and water flow plotting superficial air velocity in meters per second versus superficial water velocity in meters per second. The "superficial velocity" of one fluid is the velocity of that fluid if the other fluid was not present. The map shows that the different types of two-phase flow are dependent on such velocities. It is slug flow which is typically used for hydrodynamic cleaning in a two-phase system. High speed visualization of two-phase flow reveals that the velocity of the water slugs 12 increased with distance from the source. The increase in water slug velocity is the result of the expansion of the zones of pressurized gas 14 as the pressure within the pipe 10 decreased. That is, as the flow approached the exit of pipe 10, with that exit being at atmospheric pressure, velocity of the slugs 12 increased as the gas in the intermediate zones 14 expanded.

Figure 5:
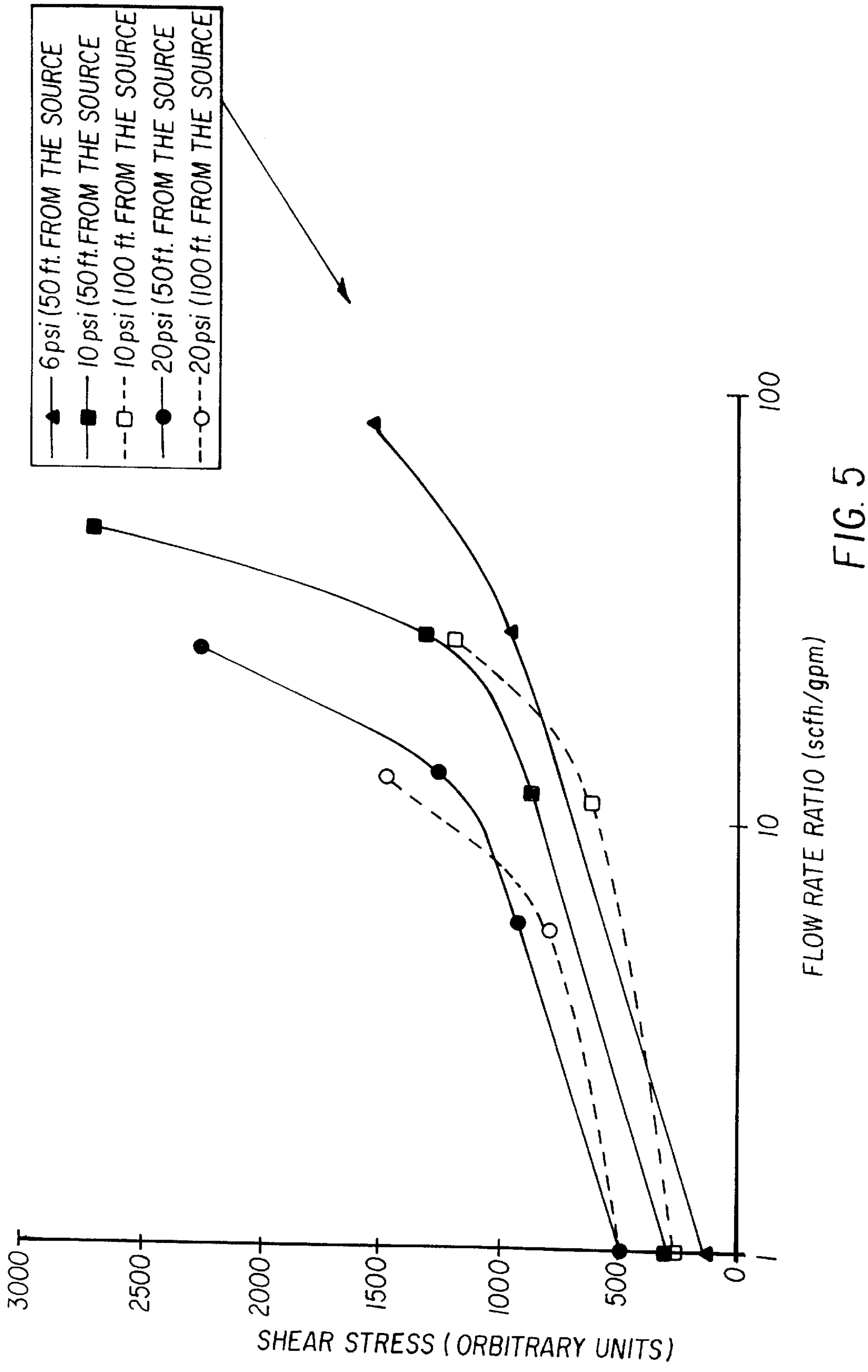
FIG. 5 is a graph plotting shear stress in arbitrary units versus flow rate ratio to demonstrate two-phase flow hydrodynamic cleaning effect for a pipe having an inside diameter of 1 inch at various pressures and at distances of 50 and 100 feet from the source.

The cleaning analysis which resulted in the data presented in FIG. 2 was conducted a second time, this time with 1" diameter pipe. The results of that were generated for the 1" diameter pipe showed similar trends to that of the ⅝" diameter pipe. These results are presented in FIG. 5. Unfortunately, the flows generated in the laboratory tests were unable to reach sufficient volumes to achieve maximum flow rate ratio for the 1" diameter pipe. Thus, incomplete data exists to define the optimum flow rate ratio for the 1" diameter piping system.

Figure 6:
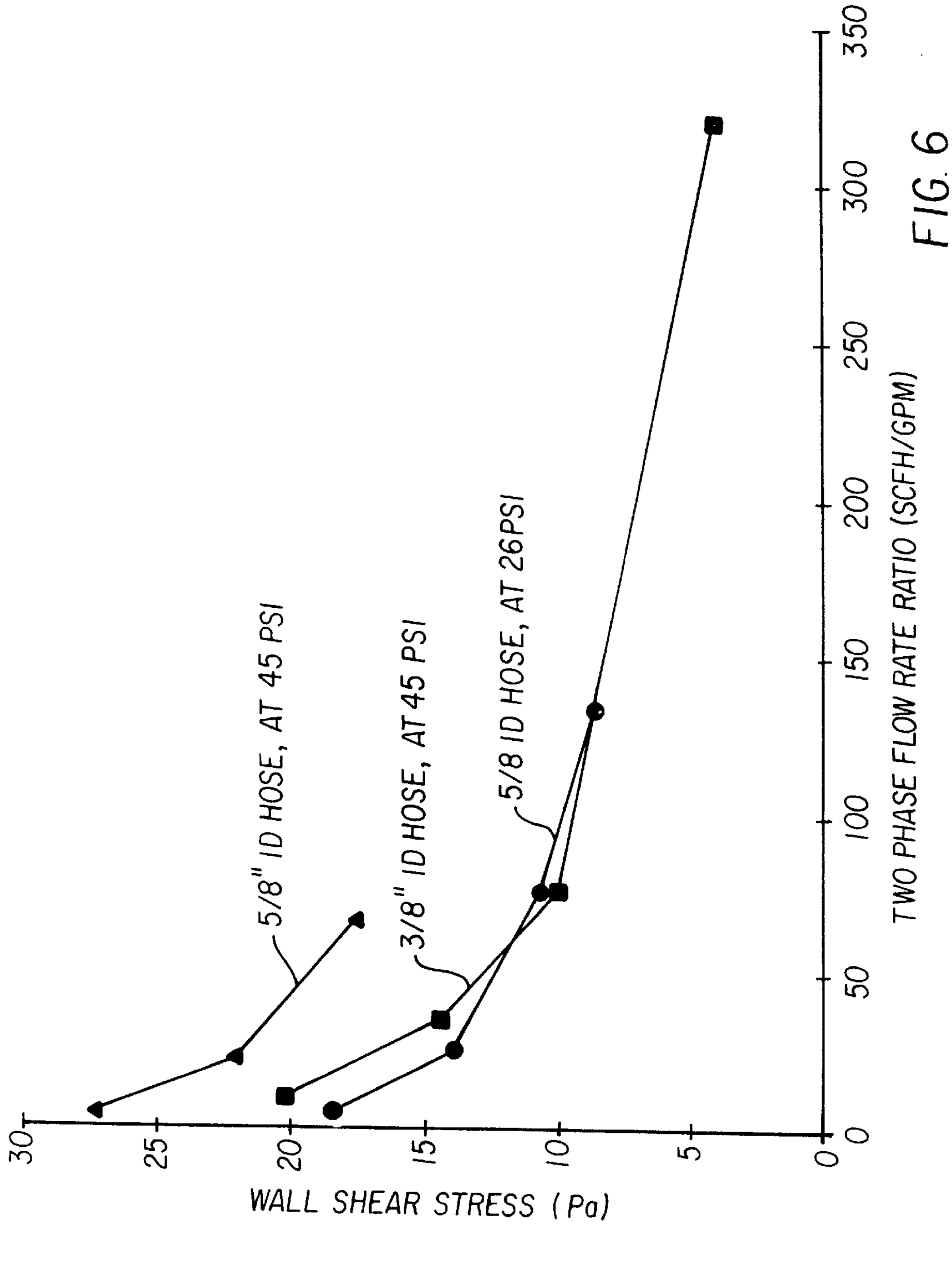
FIG. 6 is a graph of the Friedel Model prediction of wall shear stress versus two-phase flow rate ratio.
Figure 7A:
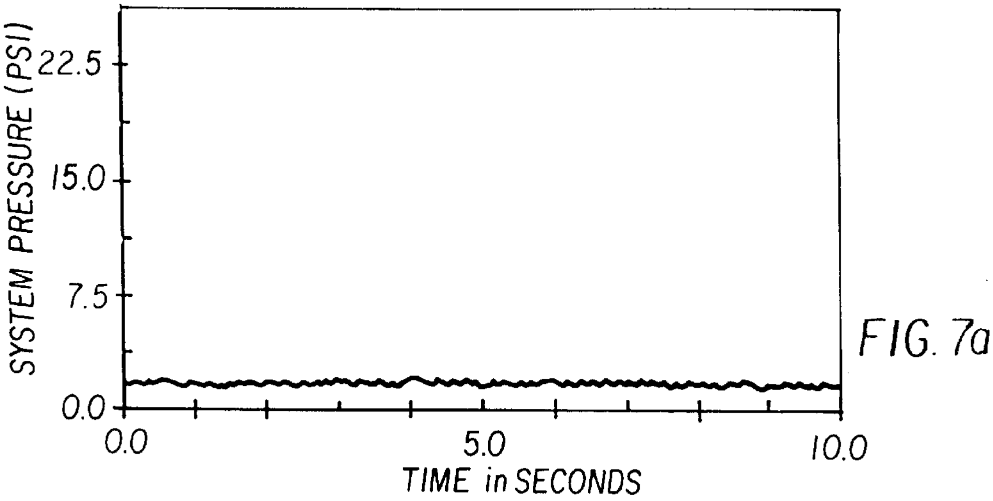
FIG. 7*a* is a graph plotting system pressure versus time for two-phase flow through a ⅝ inch diameter pipe with a constant system back pressure of 19 psi at a location 100 feet from the source and at a flow rate ratio of 8.1 scfh/gpm.
Figure 7B:
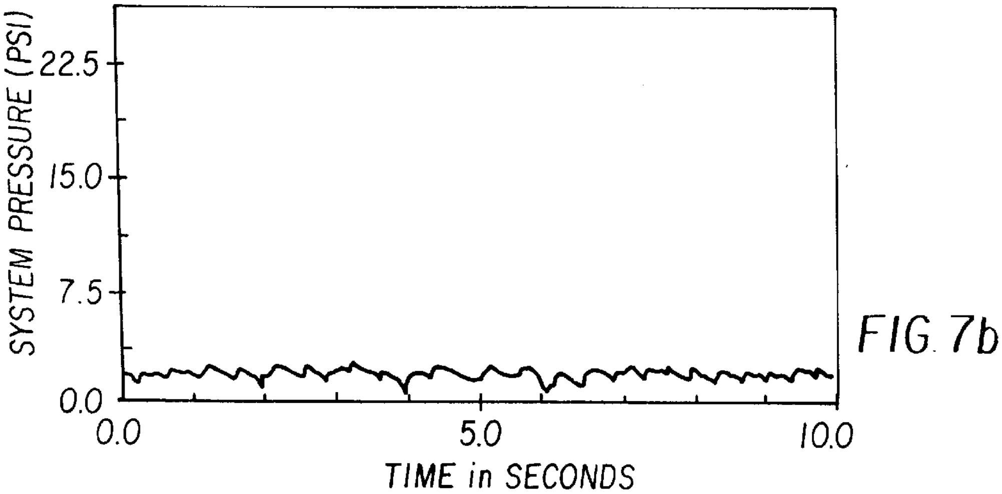
FIG. 7*b* is a graph plotting system pressure versus time for two-phase flow through a ⅝ inch diameter pipe with a constant system back pressure of 19 psi at a location 100 feet from the source and at a flow rate ratio of 18.5 scfh/gpm.
Figure 7C:
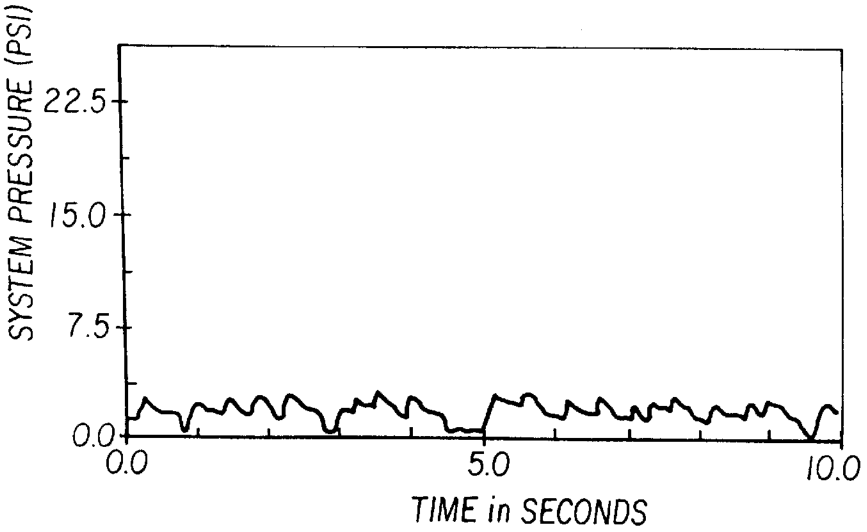
FIG. 7*c* is a graph plotting system pressure versus time for two-phase flow through a ⅝ inch diameter pipe with a constant system back pressure of 19 psi at a location 100 feet from the source and at a flow rate ratio of 34.1 scfh/gpm.
Figure 7D:
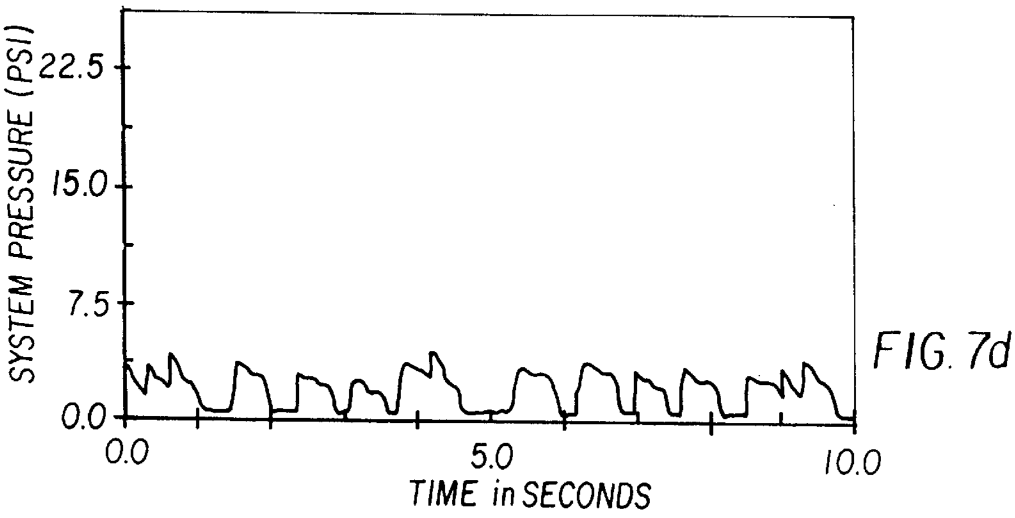
FIG. 7*d* is a graph plotting system pressure versus time for two-phase flow through a ⅝ inch diameter pipe with a constant system back pressure of 19 psi at a location 100 feet from the source and at a flow rate ratio of 50.0 scfh/gpm.
Figure 7E:
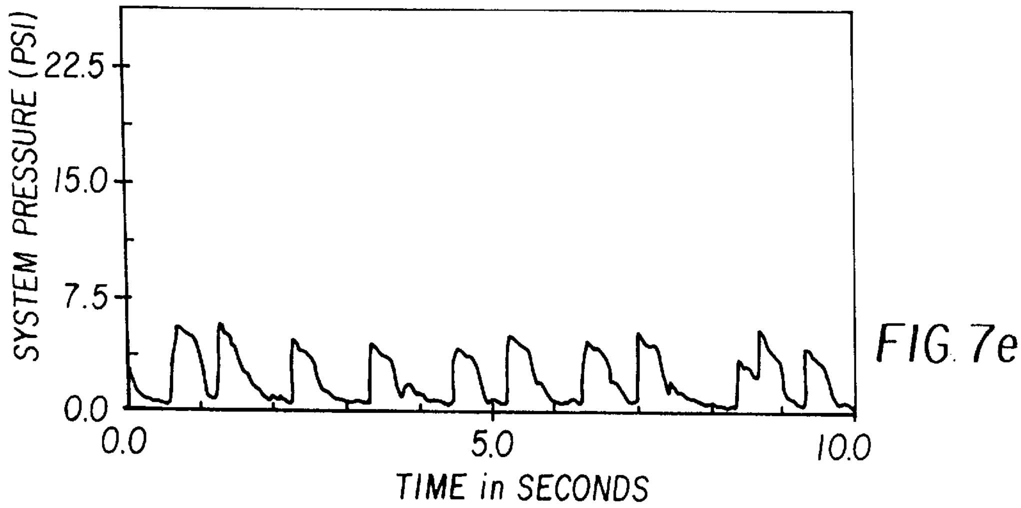
FIG. 7*e* is a graph plotting system pressure versus time for two-phase flow through a ⅝ inch diameter pipe with a constant system back pressure of 19 psi at a location 100 feet from the source and at a flow rate ratio of 125 scfh/gpm.

Analysis of the two-phase flow wall shear stress through prior art pressure drop models reveals gross differences between the actual wall shear stress determined experimentally and the wall shear stress predicted by such models. The two-phase flow wall shear stress as calculated by the Friedel Model indicated that as the flow rate ratio increased, the wall shear stress would decrease. Application of the Friedel model is graphically depicted in FIG. 6.

Assuming that wall shear stress correlates to cleaning effectiveness, the Friedel Model results are contradictory to the experimental results.

In Friedel, the correlation of system pressure to two phase flow is done through the pressure drop equation, Equation 1.

$$-\frac{\partial p_F}{\partial z} = \frac{\tau_o P}{A} \qquad (1)$$

Where: $p_F$ is the frictional pressure (N/m$^2$)

$\tau_o$ is the wall shear stress (N/m$^2$)

P is the channel periphery (m)

z is the axial dimension scale of the pipe

A is the channel cross sectional area (m$^2$)

This equation includes the frictional component of the pressure drop and does not include the accelerational and gravitational aspects of the pressure drop (considered negligible in most cases). The correlation solves for the frictional pressure gradient by employing a relationship between the frictional pressure gradient for the gas phase or liquid phase flowing alone in the channel, in terms of frictional multipliers, as shown in Equation 2:

$$(dp_F/dz) = \phi_G^2 (dp_F/dz)_G = \phi_L^2 (dp_F/dz)_L \qquad (2)$$

Where: $\phi_{``x"}$ are the friction multipliers for the different phases $(dp_F/dz)_{``x"}$ are the frictional pressure drop for the different phases The frictional pressure gradient for the gas phase or liquid phase flowing alone are calculated from standard equations and the frictional multipliers are empirically derived.

The Friedel correlation utilizes a relationship between the friction multiplier and the pressure gradient for a single-phase flow, at the same total mass velocity, and with the physical properties of the liquid phase. This relationship is shown in Equation 3:

$$\phi_{LO}^2 = (dp_F/dz)/(dp_F/dz)_{LO} \qquad (3)$$

Where: $\phi_{LO}$ is the friction multiplier $dp_F/dz$ is the frictional pressure drop $(dp_F/dz)_{LO}$ is the frictional pressure gradient for a single phase flow, at the same total mass flow velocity, with the physical properties of the liquid phase.

These equations provide the linkage between the pressure drop in the hose and the wall shear stress. However, these relationships only enable evaluation of average pressure drop and wall shear stress as opposed to the maximum and minimum values produced by a given two-phase flow.

FIGS. 7*a*–7*e* demonstrate that although the mean system back pressure generated by the two-phase flow (and therefore the mean wall shear stress generated by the two phase flow) are the same for various two-phase flow rate ratios the maximum or peak pressure (wall shear stress) is different. Thus, average pressure or average wall shear stress values, as calculated by the prior art empirical pressure drop models (Friedel, Hubbard and Duckler) are not a good indicator of the cleaning capability (peak wall shear stress) of two-phase flow.

It is believed that the gas phase of the two-phase flow would have minimal contribution to wall shear stress. Therefore, only the properties of the liquid portion, that is, the slugs 12 of the two-phase flow were examined. High speed photography of two-phase flow provided detailed information on liquid pulse velocity. The turbulent flow wall shear stress equation (from Intermediate Fluid Mechanics by R. H. Nunn) was used to examine the wall shear stress generated by the two-phase flow. The turbulent wall shear stress equation is shown in Equation 4.

$$\tau_{TP} = (0.03325 \rho_{TP}^{(0.75)} V_P^{(1.75)} \mu_{TP}^{0.25}) / r^{0.25}) \qquad (4)$$

where: $\rho_{TP}$ is the two-phase flow density (kg/m$^3$), $\mu_{TP}$ is the two-phase flow density (kg/m s), $\tau_{TP}$ is the two-phase turbulent wall shear stress (N/m$^2$), $V_p$ is the average water pulse velocity (m/s), r is the radius of the tube (m).

Figure 8:
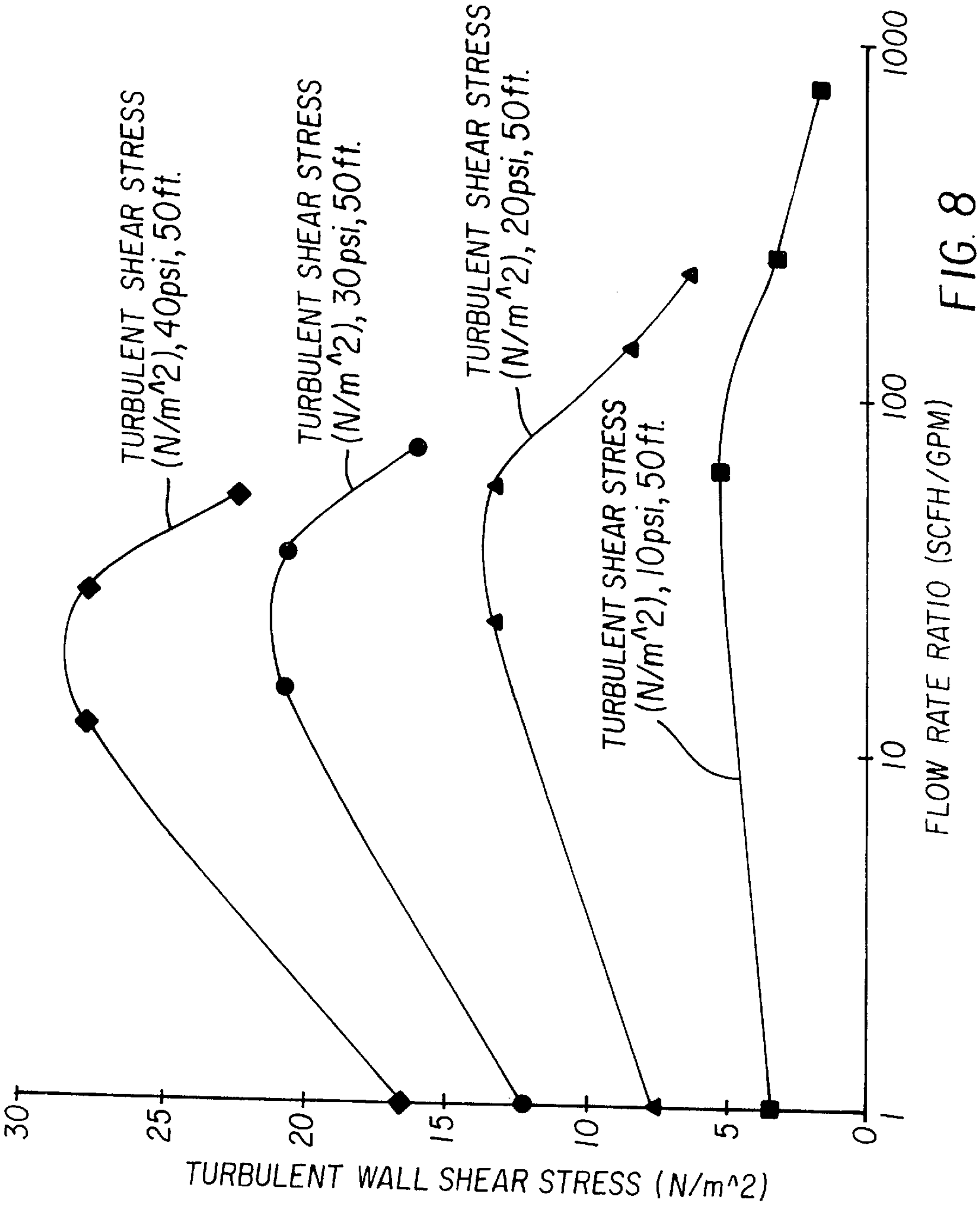
FIG. 8 is a graph of the turbulent wall shear stress curves versus flow rate ratio predicted by the semi-analytical model for a pipe having an inside diameter of 0.62 inches and at a distance of 50 feet from the source.
Figure 9:
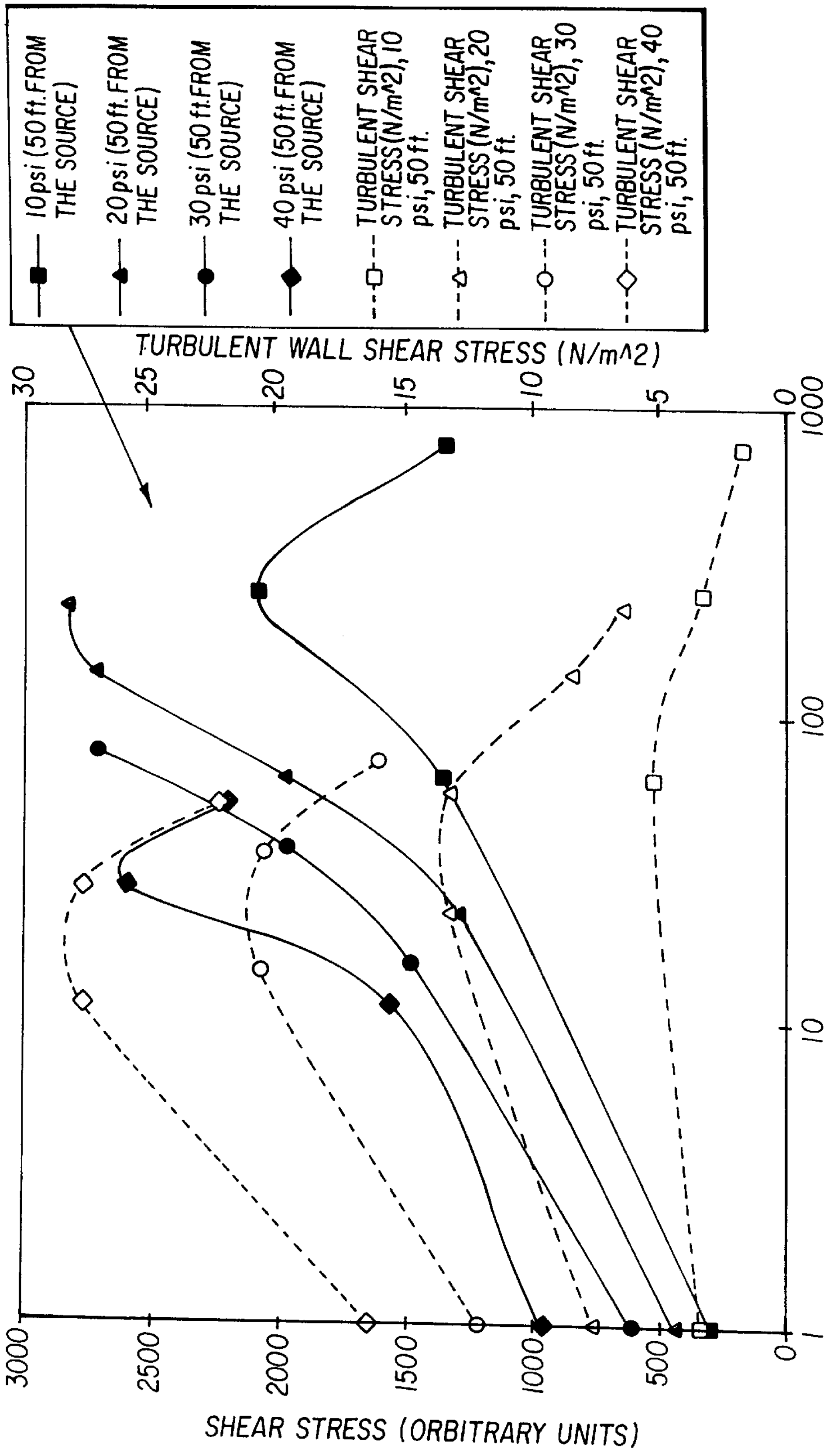
FIG. 9 is a correlation of the hydrodynamic cleaning effect as a function of flow rate ratio and system pressure to turbulent wall shear stress for a pipe having an inside diameter of 0.62 inches.
Figure 10:
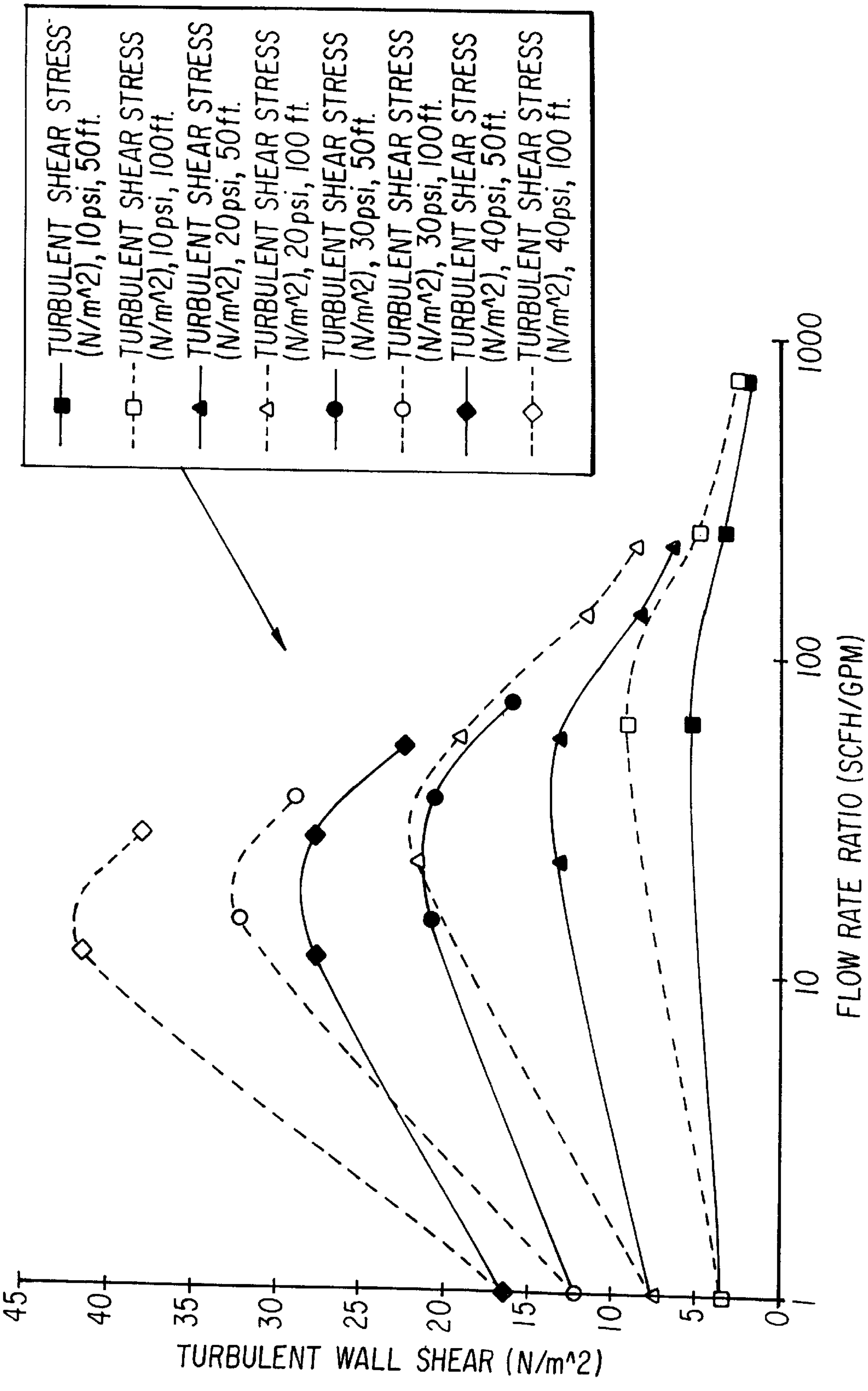
FIG. 10 is a graph comparing the results of the turbulent wall stress model depicted in FIG. 8 at pressures of 10 psi, 20 psi, 30 psi, and 40 psi at both 50 feet and 100 feet from the source.

The wall shear stress curves predicted by the turbulent wall shear stress equation are graphically depicted in FIG. 8. The empirical and the turbulent wall shear stress model results are plotted together in FIG. 9. A review of FIG. 9 shows that the turbulent wall shear stress data have the same general trends as that of the laboratory measurement apparatus data. It can be seen that an increased wall shear stress occurred with an increase in system pressure. In addition, increased wall shear stress was achieved with an increase of the flow rate ratio to an optimum point, wall shear stress decreased with a continued increase in flow rate ratio with the exception of the 40 psi experimental data shown in FIG. 2 and the 30 psi data shown in FIG. 9. The peak was not achieved for these two systems because of process flow limitations in the laboratory. Thus, the turbulent wall shear stress model graphically depicted in FIG. 8 and given by Equation 4 is able to predict the trends of the experimental data. The turbulent wall shear stress model is also shown to predict the trend of increased cleaning efficiency with increased distance from the source. FIG. 10 compares the results of the model at 10 psi, 20 psi, 30 psi and 40 psi at both 50 feet and 100 feet from the source. The model clearly predicts that as the distance from the source increases so will the cleaning effectiveness. The model also predicts that the optimum flow rate ratio decreases as the distance from the source increases. These trends both agree with the experimental results, see FIG. 2.

The turbulent wall shear stress model accurately replicated all of the trends of the experimental data (increase in cleaning efficiency with distance from the source, increase in cleaning efficiency with increasing system pressure, and the existence of an optimum flow rate ratio). However, the turbulent wall shear stress model optimum wall shear stress predictions were significantly different from those of the experimental data. Based on these results, a modified turbulent wall shear stress equation was developed to fit the empirical data.

Thus, in the practices of the present invention a semi-analytical approach is taken to the modeling of the two-phase flow wall shear stress. This semi-analytical modeling required an understanding of two-phase flow dynamics. The turbulent wall shear stress equation was used as the basis for the semi-analytical model, i.e., only the properties of the liquid portion, that is, the slugs 12 of the two-phase flow were examined. High speed photography of two-phase flow provided detailed information on liquid pulse velocity and further provided insight on liquid slug density and viscosity. Based on these observations, the turbulent flow wall shear stress equation was modified to utilize the liquid slug properties resulting in Equations 5 through 10 below.

$$V_R=V_{FRR}/V_{FRR=0} \quad (5)$$

where: $V_R$ is the velocity ratio factor (pressure and flow rate ratio specific variable)

$V_{FRR=0}$ is the mean velocity of single-phase fluid flow, at a given pressure (m/s)

$V_{FRR}$ is the pulse velocity, at the same pressure as $V_{FRR=0}$ (m/s)

$$\rho_{TP}^a=\rho_{TP}+((\rho_L-\rho_{TP})/(2^*V_R)) \quad (6)$$

where: $\rho_{TP}^a$ is the adjusted two-phase flow density (kg/m$^3$), $\rho_L$ is the liquid phase density (kg/m$^3$), and $\rho_{TP}$ is the two-phase flow density (kg/m$^3$) given by the equation $$\rho_{TP}=((x/\rho_G)+(1-x)/\rho_L)^{-1} \quad (7)$$

where:

x is the quality of the two-phase flow (mass flux of gas/total mass flux)

$\rho_L$ is the liquid phase density (kg/m$^3$)

$\rho_G$ is the gas phase density (kg/m$^3$)

$\rho_{TP}$ is the two-phase density (kg/m$^3$)

$$\mu_{TP}^a=\mu_{TP}+((\mu_L-\mu_{TP})/(2^*V_R)) \quad (8)$$

where: $\mu_{TP}^a$ is the adjusted two-phase flow viscosity (kg/m s)

$\mu_{TP}$ is the two-phase viscosity (kg/m s) and is determined from the equation $$\frac{1}{\mu_{TP}}=\frac{x}{\mu_G}+\frac{1-x}{\mu_L} \quad (9)$$

$\mu_L$ is the liquid viscosity (kg/m s)

$\mu_G$ is the gas phase viscosity (kg/m s)

$$\tau_{TP}^a=(0.03325\rho_{TP}^{a(0.75)}V_P^{(1.75)}\mu_{TP}^{a\,0.25})/r^{0.25}) \quad (10)$$

where: $\rho_{TP}^a$ is the adjusted two-phase flow density (kg/m$^3$), $\mu_{TP}^a$ is the adjusted two-phase flow density (kg/m s), $\tau_{TP}^a$ is the adjusted two-phase turbulent wall shear stress (N/m$^2$), $V_p$ is the average water pulse velocity (m/s), r is the radius of the tube (m).

In order to use Equation 5 above to define $V_R$ information is required on $V_{FRR}$ (or the water pulse velocity). Empirical relationships have been generated for determining the water phase pulse speed. These relationships are given in Table below for ⅜, ⅝, and 1.0 inch inside diameter hose.

TABLE

| Hose Diameter, | Model | F Value | PR > F | $R^2$ |
|---|---|---|---|---|
| ⅜ inch ID Hose, Pulse Velocity | V = −33.86 − 122.2*Qw + 8.53*Qa + 102.5*Qw$^2$ − 0.066*Qa$^2$ + .545*Qa*Qw + 2.02*D | 22.59 | .0001 | .906 |
| ⅝ inch ID Hose, Pulse Velocity | V = −12.49 + 11.07*Qw + 1.94*Qa + .564*Qw$^2$ − .0043*Qa$^2$ + .029*Qw*Qa + .982*D | 23.92 | .0001 | .878 |
| 1 inch ID Hose, Pulse Velocity | V = 6.41 + 14.87*Qw + .125*Qa − 1.05*Qw2 + .0664*Qw*Qa + .3*D | 17.43 | .0016 | .936 |

Where: Qw is the water flow rate (GPM)
Qa is the air flow rate (SCFH)
D is the distance from the source (ft)

The semi-analytical model (modified wall shear stress equation) (Equation 10) takes into account the key properties of two-phase flow, those being flow rate ratio and the solution properties of viscosity and density.

In the development of these equations, the effect of flow rate ratio was taken into consideration by utilizing a ratio of two-phase flow pulse velocity to the single-phase flow mean velocity. The effect of two-phase flow density and viscosity was taken into consideration by adjusting the two-phase flow parameters, that is density and viscosity, such that they more closely resemble the experimentally obtained values.

It is important to note that the model used in the practice of the present invention was purposely "constructed" to underestimate the optimum flow rate ratio. This was done to err on the side of too much water rather to err on the side of too much air thereby reducing the potential for blow drying the piping system. In other words, the factors ($\rho_{TP}^a$ and $\mu_{TP}^a$) could be further modified by those skilled in the art to more closely represent the experimental data. Modifying such factors to more closely represent the experimental data is not preferred, however, because of the potential for air drying if too much air is used.

Figure 11:
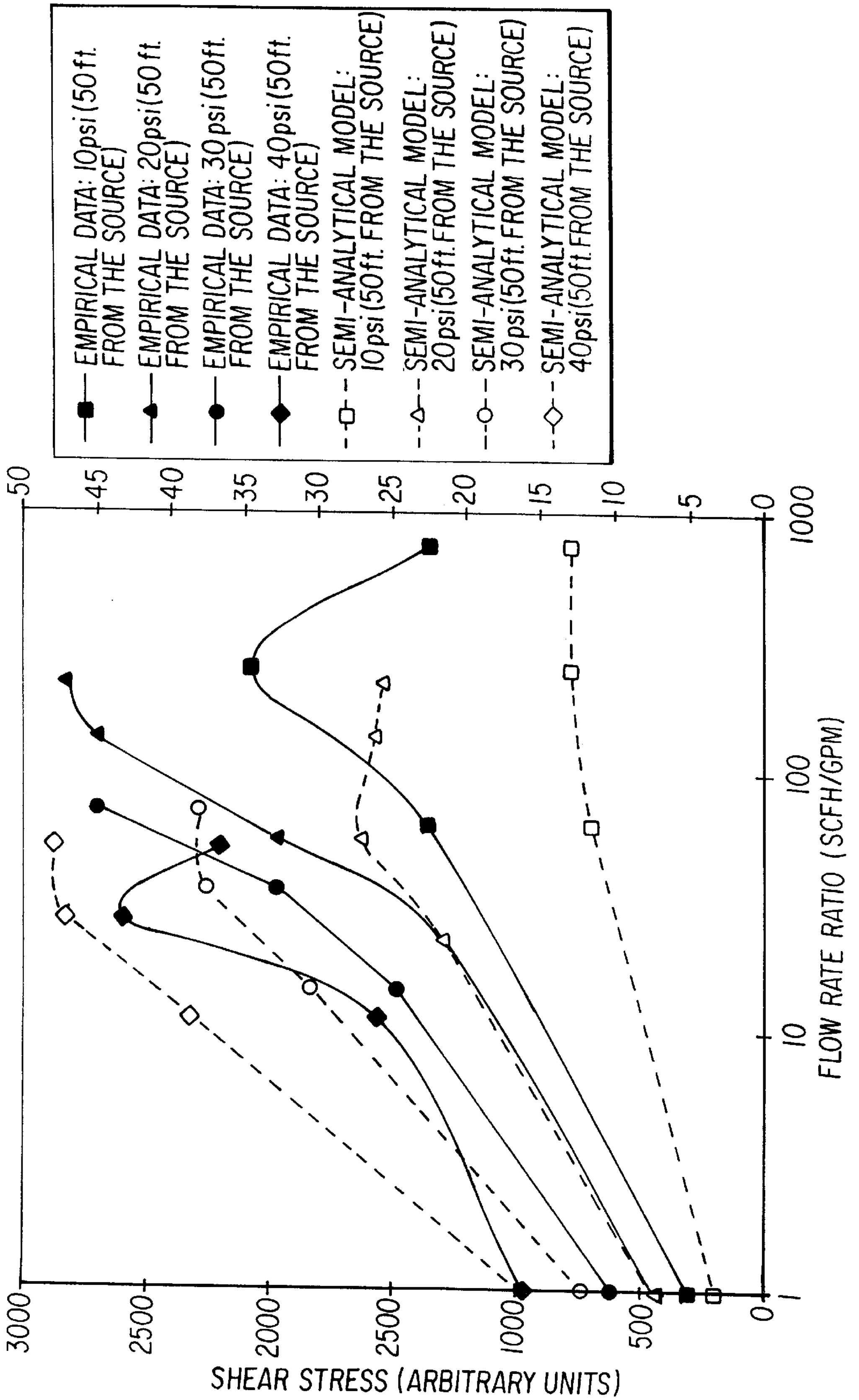
FIG. 11 is a correlation of the hydrodynamic cleaning effect as a function of flow rate ratio and system pressure to semi-analytical model (modified turbulent wall shear stress equation) for a pipe having an inside diameter of 0.62 inches.
Figure 12:
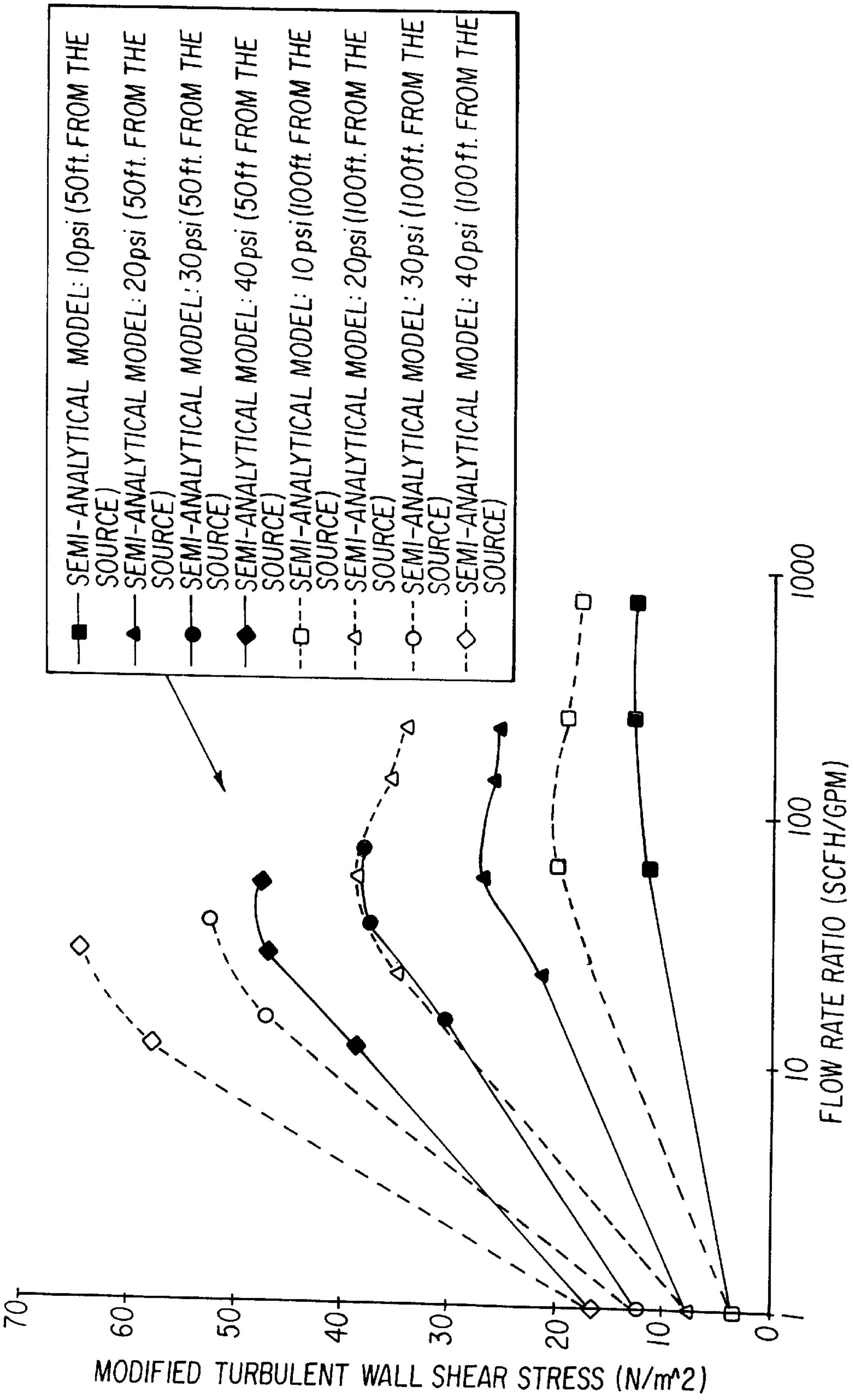
FIG. 12 is a graph comparing the results of the semi-analytical model depicted in FIG. 11 at pressures of 10 psi, 20 psi, 30 psi, and 40 psi at both 50 feet and 100 feet from the source.

The wall shear stress curves predicted by the semi-analytical model of Equations 5 through 10 is graphically depicted in FIG. 11. In FIG. 11 the empirical and semi-analytical model results are plotted together. A review of FIG. 11 shows that the turbulent wall shear stress data have the same general trends as that of the laboratory measurement apparatus data: increase in cleaning efficiency with increasing system pressure and the existence of an optimum flow rate ratio. FIG. 12 compares the results of the semi-analytical model at 10 psi, 20 psi, 30 psi and 40 psi at both 50 feet and 100 feet from the source. The model clearly predicts an increase in cleaning efficiency with distance from the source. The model also predicts that the optimum flow rate ratio decreases as the distance from the source increases. These trends agree with the experimental results.

Based on these results, an optimum flow rate ratio relationship was developed given in Equations 11, 12 and 13 below:

$$FRR_{min}=10^{(2.503-0.04551*Psys+0.0005112*Psys*psys)} \quad (11)$$

$$FRR_{max}=10^{(2.632-0.049646*Psys+0.0005842*Psys*Psys)} \quad (12)$$

$$FRR_{opt}=(FRR_{min}+FRR_{max})/2 \quad (13)$$

where: $FRR_{min}$ is the minimum recommended flow rate ratio, $FRR_{max}$ is the maximum recommended flow rate ratio, $FRR_{opt}$ is the recommended flow rate ratio, and $P_{sys}$ is the liquid system pressure Once the optimum flow rate ratio has been calculated the gas flow rate can be determined by Equation 14 which reads:

$$FR_{gas}=[FRR_{opt}]*[FR_{water}] \quad (14)$$

where: $FR_{gas}$ is the air flow rate (scfh), $FRR_{rec}$ is the recommended flow rate ratio, $FR_{water}$ is the water flow rate (gpm).

Figure 13:
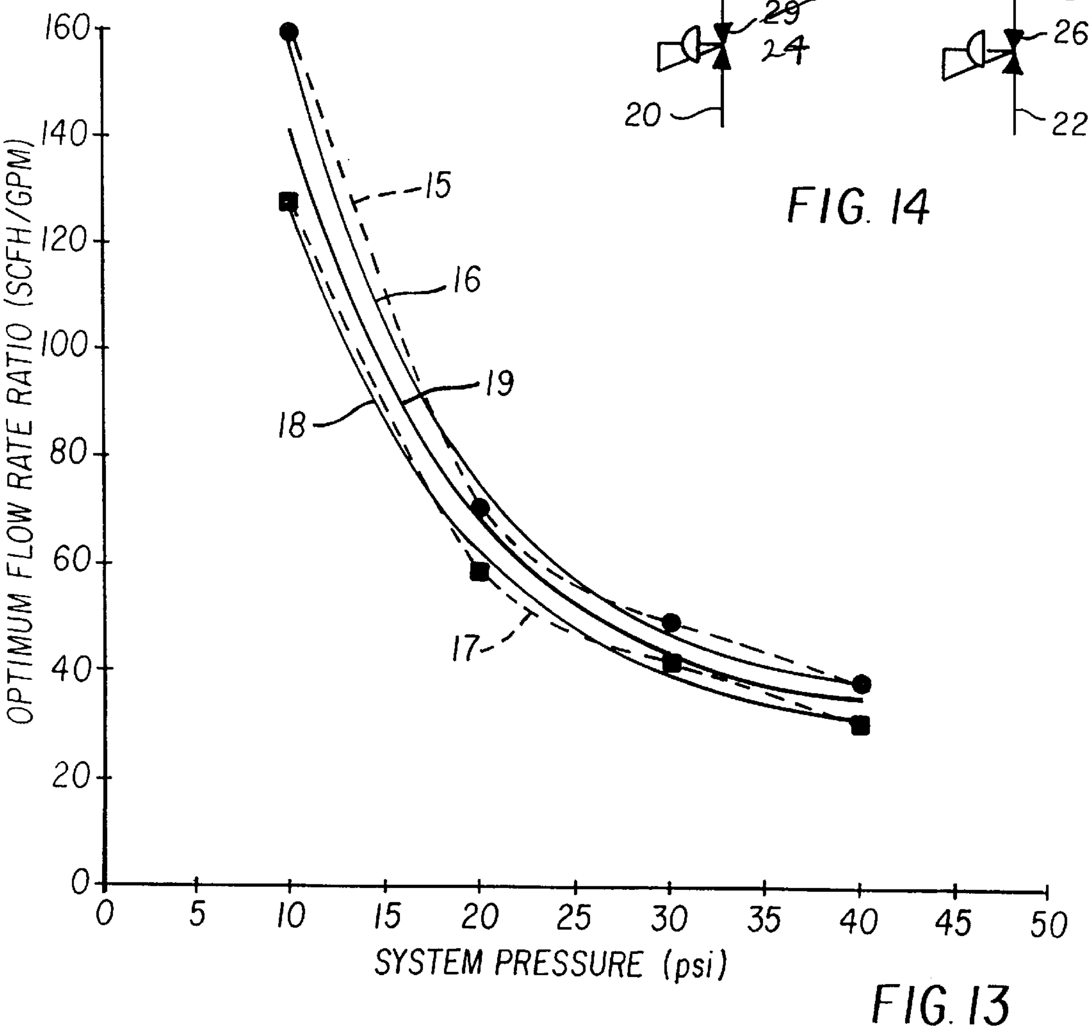
FIG. 13 is a graph showing the optimum flow rate ratio range with the model used in the practice of the present invention as a function of system pressure.

The model expressed in Equations 11 through 13 is graphically depicted in FIG. 13. Five curves 15, 16, 17, 18 and 19 are shown in FIG. 13. The definitions of the curves are as follows:

Curve 15 represents the maximum recommended flow rate ratio, as generated using the semi-analytical model (modified turbulent wall shear stress equation);

Curve 16 represents the mathematical model used to fit the data of Curve 15;

Curve 17 represents the minimum recommended flow rate ratio, as generated using the semi-analytical model;

Curve 18 represents the mathematical model used to fit the data of Curve 17; and, Curve 19 represents the mathematical model for the optimum flow rate ratio, which is an average of the minimum and maximum models.

The model shown in FIG. 13 utilizes both the experimental results and the semi-analytical. This is necessary because utilization of the experimental results alone can result in problems in implementation. Flow rate ratios slightly higher than the recommended or optimum flow rate ratios for a particular piping system could produce drying of the system. This could be a problem if the liquid and gas applied pressures or flow rates fluctuate due to air and water system design, i.e., utilization of one air or water supply for cleaning several piping systems at the same time. The semi-analytical results under predicted the optimum flow rate ratio.

Therefore, this resulted in a decrease in cleaning effectiveness. The model strikes a balance between cleaning efficiency and implementation concerns.

For piping systems which include multiple pipe diameters, the optimum flow rate ratio should be set based upon the back pressure of the entire piping system. The resulting water and air flow rates would have to be compared to empirical data to determine if such flow rates are sufficient for achieving slug flow. Cleaning multiple diameter piping systems in this manner is not preferred. However, it should be recognized that multiple diameter piping systems can be opened at different locations thereof to yield multiple piping subsystems such that each subsystem is comprised of single diameter piping. In this manner, the method of the present invention can be more accurately practiced.

It should be understood that as the ratio of air flow to liquid flow increases, the average density and viscosity of the two-phase flow solution decreases. However, the ratio of gas to liquid at which the optimum flow rate occurs is certainly not apparent. It is further surprising that the optimum flow rate ratio changes as the system back pressure changes.

Finally, it is particularly surprising that the cleaning efficiency farthest from the two-phase flow source would be greater than the cleaning efficiency nearer the source and that the optimum flow rate ratio decreases with distance from the source.

In the practice of the method of the present invention, the optimum flow rate is preferably established by turning on the liquid and gas flows through the system being cleaned and allowing the combined flow to reach a steady state condition. The back pressure of the system is measured on the water supply just prior to the air injection point and the optimization equations (Equations 11 through 13) are used to determine the optimum flow rate ratio. Once the optimum flow rate ratio has been calculated, the liquid flow rate and the gas flow rate can each be adjusted such that the optimum ratio is achieved. The two-phase back pressure is then measured to verify that the optimum flow rate ratio has been used. This is done by comparing the measured optimum two-phase flow back pressure with the initial two-phase back pressure used in the equations. If there is a variance between the two back pressures then the measured back pressure is substituted into the equations for the initial back pressure and the optimum flow rate ratio is recalculated. This step is repeated until the measured back pressure is equal to the back pressure used in the calculations.

If the two-phase total back pressure is greater than the water system pressure, the total back pressure will only reach that of the water system pressure. This enables calculation of the optimum flow rate ratio using Equations 11 through 13 above. However, if the two-phase system back pressure does not exceed the maximum water system pressure, the iterative process discussed above should be followed to determine the system back pressure and the optimum flow rate ratio. Two examples are provided below to demonstrate the establishment of the back pressure for a particular system.

An alternative way of practicing the method of the present invention is to establish an initial optimum flow rate ratio by turning on the liquid flow through the system being cleaned and allowing the flow to reach a steady state condition. The back pressure on the water supply is then measured just prior to the air injection point. This water only back pressure is used in the optimization equations (Equations 11 through 13) to determine the optimum flow rate ratio. Once the optimum flow rate ratio has been calculated, the liquid and gas flow rates can be adjusted such that the calculated optimum flow rate ratio is achieved. The two-phase back pressure is then measured to verify that the calculated optimum flow rate ratio has been used. This is done by comparing the measured optimum two-phase flow back pressure with the initial water only back pressure used in the equations. If there is a variance between the two back pressures then the measured back pressure is substituted into Equations 11 through 13 for the initial back pressure and optimum flow rate ratio is recalculated. This last step is repeated until the measured back pressure is equal to the back pressure used in the equations.

Still another way of arriving at the optimum flow rate ratio in the practice of the method of the present invention is to first establish an initial optimum flow rate ratio by turning on the liquid flow through the system being cleaned and allowing the flow to reach a steady state condition. The back pressure on the water supply is then measured just prior to the air injection point. The two-phase flow back pressure will be greater than the measured water only back pressure. Therefore, the two-phase back pressure can be estimated by multiplying the water only back pressure by a factor of 1.25 (an approximate increase of 25% over the water only back pressure with the addition of air has been observed). The two-phase back pressure is used in Equations 11 through 13 to determine the optimum flow rate ratio. Once the optimum flow rate ratio has been calculated, the liquid and gas flow rates can be adjusted such that the calculated optimum flow rate ratio is achieved. The two-phase back pressure is then measured to verify that the calculated optimum flow rate ratio has been used. This is done by comparing the measured optimum two-phase flow back pressure with the initial water only back pressure used in the equations. If there is a variance between the two back pressures then the measured back pressure is substituted into Equations 11 through 13 for the initial back pressure and optimum flow rate ratio is recalculated. This last step is repeated until the measured back pressure is equal to the back pressure used in the equations.

EXAMPLE 1

Water system pressure: 40 psig

Water back pressure through system: 20 psig

Total system back pressure with the addition of air (assuming an unlimited water supply pressure): 35 psig In this example, the system will reach a final back pressure of 35 psig as determined by the iterative process discussed above and the appropriate air to water ratio for 35 psig can be established. Thus, from Equations 11 through 13, $$FRR_{min} = 10^{(2.503-.04551*35+.0005112*35*35)}$$
$$= 10^{1.536} = 34.4 \text{ scfh/gpm}$$
$$FRR_{max} = 10^{(2.632-.049646*35+.0005842*35*35)}$$
$$= 10^{1.610} = 40.7 \text{ scfh/gpm}$$
$$FRR_{opt} = (34.4 \text{ scfh/gpm} + 40.7 \text{ scfh/gpm})/2$$
$$= 37.55 \text{ scfh/gpm}$$

EXAMPLE 2

Water system pressure: 25 psig

Water back pressure through system: 20 psig

Total system back pressure with addition of air from empirical relationship (assuming an unlimited water supply pressure): 35 psig.

In this example, the system back pressure will reach a maximum of 25 psig. Thus, the air to water ratio must be established for a back pressure of 25 psig as opposed to 35 psig. Thus, from Equations 11 through 13, $$FRR_{min} = 10^{(2.503-.04551*25+.0005112*25*25)}$$
$$= 10^{1.6847} = 48.4 \text{ scfh/gpm}$$
$$FRR_{max} = 10^{(2.632-.049646*25+.0005842*25*25)}$$
$$= 10^{1.756} = 57.0 \text{ scfh/gpm}$$
$$FRR_{opt} = (48.4 \text{ scfh/gpm} + 57.0 \text{ scfh/gpm})/2$$
$$= 52.7 \text{ scfh/gpm}$$

Figure 14:
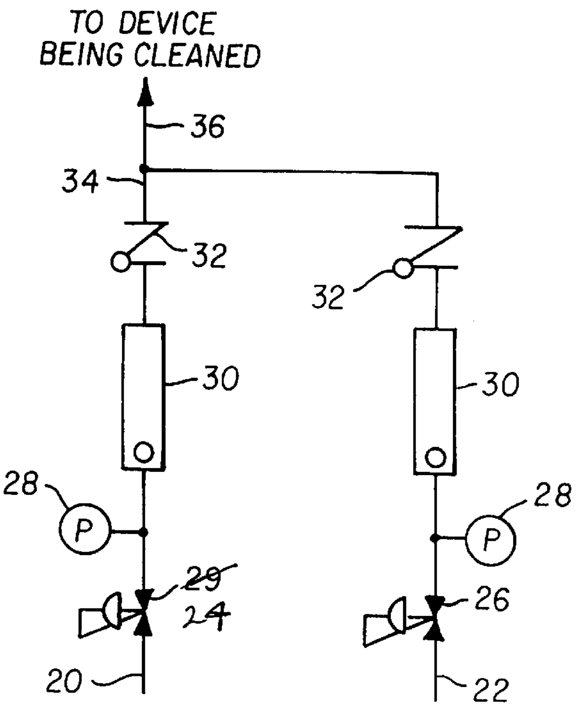
FIG. 14 is a schematic depiction of one example of a two-phase flow cleaning apparatus which can be used to practice the method of the present invention.

One example of a basic two-phase flow cleaning system is depicted in FIG. 14. A first pipe 20 through which the incoming cleaning liquid (e.g., water) is transmitted to the piping system being cleaned. There is a second pipe 22 through which the gas (e.g., air) is transmitted to the piping system to be cleaned. There is a pressure regulator valve 24 in pipeline 20 and a pressure regulator valve 26 in pipeline 22. In addition, each pipe 20, 22 has a pressure gauge 28 mounted thereon. Downstream of each pressure gauge 28 is a flow measurement and flow regulation device 30. Each flow measurement and flow regulation device 30 is preferably a positive displacement type of device such as a rotometer. Downstream of each flow measurement and flow regulation device 30 and mounted in the respective pipelines 20, 22 is a check valve 32. The pipelines 20, 22 then merge at mixing tee 34 with the resultant combined pipeline 36 being connected to the piping system to be cleaned (not shown). With this two-phase flow cleaning system attached to the piping system to be cleaned, the liquid flow is turned on first. Once the system to be cleaned is filled, the gas flow is then begun. Pressure gauges 28 are used to determine the system pressure. The optimization equation is applied to determine the optimum flow rate ratio. The flow measurement and flow regulations devices 30 are then used to adjust to the desired optimum flow rate for each stream.

In some cases, it has been observed that the flow rates utilized for two-phase cleaning are either too low or too high. In situations where the flow rate is too low such as can occur with cleaning system designs with low water system volume capabilities and/or high delivery system back pressures, this can result in producing poor or inadequate cleaning. In situations where the flow rate is too high such as can occur with cleaning system designs with high water system volume capabilities and low delivery system back pressures, this can result in producing violent shaking of the process piping. Violent delivery line shaking becomes an issue with hard-piped systems, where repeated shaking can result in stress fractures, leaks, etc. Because of these concerns, guidelines for minimum and maximum water flow rates have been established. These guidelines are to be applied in special cases where the two-phase water flow is too low (insufficient cleaning) or too high (excessive vibrations). In addition, the guidelines can be used to size equipment for powerflush system installation. The guidelines are based on a cross sectional area scaling of powerflush data from experiments with a 0.62 inch ID hose (see Equations 15 and 16 below).

$$WF_{min}=[A/0.3068(in^2)]*2.0 \quad (15)$$

$$WF_{max}=[A/0.3068(in^2)]*5.0 \quad (16)$$

Where: $WF_{min}$ is the minimum recommended water flow rate (gpm), $WF_{max}$ is the maximum recommended water flow rate (gpm), A is the cross sectional area of the line being cleaned ($in^2$).

The invention has been discussed herein with the two-phase flow stated to be air and water. Those skilled in the art will recognize that liquid solvents and gases can be used in the practice of the present invention.

From the foregoing, it will be seen that this invention is one well adapted to attain all of the ends and objects hereinabove set forth together with other advantages which are apparent and which are inherent to the invention.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

What is claimed is:

1. A method for cleaning piping systems with a two-phase fluid flow comprising the steps of:

(a) measuring a piping system back pressure for the piping system to be cleaned;

(b) determining a minimum flow rate ratio for cleaning the piping system using the measured system back pressure;

(c) determining a maximum flow rate ratio for cleaning the piping system using the measured system back pressure;

(d) calculating an optimum flow rate ratio using the minimum and maximum flow rate ratios;

(e) using the optimum flow rate ratio to determine a gas flow rate and a liquid flow rate for a two-phase fluid flow; and (f) cleaning the piping system by delivering the two-phase fluid flow to the piping system to be cleaned at the optimum flow rate ratio.

2. A method as recited in claim 1 wherein:

said step for determining the minimum flow ratio ($FRR_{min}$) is performed using the equation $$FRR_{min}=10^{(2.503-0.04551*Psys+0.0005112*Psys*Psys)}$$

where $P_{sys}$ is the liquid system pressure.

3. A method as recited in claim 1 wherein:

said step for determining the maximum flow ratio ($FRR_{max}$) is performed using the equation $$FRR_{max}=10(2.632-0.049646*Psys+0.0005842*Psys*Psys)$$

where $P_{sys}$ is the liquid system pressure.

4. A method as recited in claim 1 wherein:

said step for calculating the optimum flow ratio ($FRR_{opt}$) is performed using the equation $$FRR_{opt}=(FRR_{min}+FRR_{max})/2$$

where $FRR_{min}$ is the minimum recommended flow rate ratio, and $FRR_{max}$ is the maximum recommended flow rate ratio.

5. A method as recited in claim 1 wherein:

the gas and liquid flow rates are determined using the equation $$FR_{gas}=(FRR_{opt})(FR_{water})$$

where $FR_{gas}$ is the air flow rate, $FRR_{opt}$ is the optimum flow rate ratio, and $FR_{water}$ is the water flow rate.

6. A method for cleaning piping systems with a two-phase fluid flow comprising the steps of:

(a) determining a piping system back pressure for a piping system to be cleaned;

(b) using the piping system back pressure in a model to determine an optimum flow rate ratio for the two-phase fluid flow through the piping system to be cleaned, the optimum flow rate ratio maximizing peak wall shear stress imparted by the two-phase fluid flow to the piping system to be cleaned; and (c) cleaning the piping system by delivering the two-phase fluid flow to the piping system to be cleaned at about the optimum flow rate ratio.

7. A method for cleaning piping systems with a two-phase fluid flow comprising the steps of:

(a) determining a piping system back pressure for a piping system to be cleaned;

(b) using the piping system back pressure to determine an optimum flow rate ratio for the two-phase fluid flow through the piping system to be cleaned, the optimum flow rate ratio maximizing peak wall shear stress imparted by the two-phase fluid flow to the piping system to be cleaned; and (c) cleaning the piping system by delivering the two-phase fluid flow to the piping system to be cleaned at about the optimum flow rate ratio.

8. A method as recited in claim 6 wherein said using step comprises the steps of:

(a) determining a minimum flow rate ratio for the piping system to be cleaned;

(b) determining a maximum flow rate ratio for the piping system to be cleaned; and (c) calculating an optimum flow rate ratio using the minimum and maximum flow rate ratios.

9. A method as recited in claim 8 further comprising the step of:

determining a gas flow rate using the optimum flow rate ratio.

10. A method as recited in claim 8 wherein:

said step for determining the minimum flow ratio ($FRR_{min}$) is performed using the equation $$FRR_{min}=10^{(2.503-0.04551*Psys+0.0005112*Psys*Psys)}$$

where $P_{sys}$ is the liquid system pressure.

11. A method as recited in claim 8 wherein:

said step for determining the maximum flow ratio ($FRR_{max}$) is performed using the equation $$FRR_{max}=10^{(2.632-0.049646*Psys+0.0005842*Psys*Psys)}$$

where $P_{sys}$ is the liquid system pressure.

12. A method as recited in claim 8 wherein:

said step for calculating the optimum flow ratio ($FRR_{opt}$) is performed using the equation $$FRR_{opt}=(FRR_{min}+FRR_{max})/2$$

where $FRR_{min}$ is the minimum recommended flow rate ratio, and $FRR_{max}$ is the maximum recommended flow rate ratio.

13. A method as recited in claim 9 wherein:

the gas and liquid flow rates are determined using the equation $$FR_{gas}=(FRR_{opt})(FR_{water})$$

where $FR_{gas}$ is the air flow rate, $FRR_{opt}$ is the optimum flow rate ratio, and $FR_{water}$ is the water flow rate.

14. A method for determining an optimum two-phase flow rate ratio for cleaning piping systems comprising the steps of:

(a) flowing liquid through a piping system to be cleaned;

(b) simultaneously flowing gas through the piping system to yield a combined flow;

(c) allowing the combined flow to reach steady state;

(d) measuring a system back pressure for the piping system to be cleaned;

(e) calculating a preliminary optimum flow rate ratio using the system back pressure;

(f) using the preliminary optimum flow rate ratio to determine a gas flow rate and a liquid flow rate for a two-phase fluid flow;

(g) adjusting the flow rate of liquid and the flow rate of gas through the piping system to achieve the preliminary optimum flow rate ratio;

(h) measuring system back pressure at the preliminary optimum flow rate ratio;

(i) comparing the measured system back pressure of step (h) with the measured system back pressure of step (d); and (j) calculating a new optimum flow rate ratio using the measured system back pressure of step (h) if there is a variance between the measured system back pressure of step (h) and the measured system back pressure of step (d).

15. A method as recited in claim 14 further comprising the steps of:

(a) adjusting the flow rate of liquid and the flow rate of gas through the piping system to achieve the new optimum flow rate ratio;

(b) measuring system back pressure at the new optimum flow rate ratio; and (c) repeating said recalculating step if there is another variance between the measured system back pressure at the new optimum flow rate ratio with the measured system back pressure at the preliminary optimum flow rate ratio.

16. A method as recited in claim 15 further comprising the step of:

delivering the two-phase fluid flow to the piping system to be cleaned at the optimum flow rate ratio.

17. A method for determining an optimum two-phase flow rate ratio for cleaning piping systems comprising the steps of:

(a) flowing liquid through a piping system to be cleaned;

(b) measuring a system back pressure for the piping system;

(c) calculating a preliminary optimum flow rate ratio using the using the system back pressure;

(d) simultaneously flowing gas through the piping system with the flowing liquid to yield a combined flow;

(e) allowing the combined flow to reach steady state;

(f) adjusting the flow rate of liquid and the flow rate of gas through the piping system to achieve the preliminary optimum flow rate ratio;

(g) measuring system back pressure at the preliminary optimum flow rate ratio;

(h) comparing the measured system back pressure of step (g) with the measured system back pressure of step (b); and (i) calculating a new optimum flow rate ratio using the measured system back pressure of step (g) if there is a variance between the measured system back pressure of step (g) and the measured system back pressure of step.

18. A method as recited in claim 17 further comprising the steps of:

(a) adjusting the flow rate of liquid and the flow rate of gas through the piping system to achieve the new optimum flow rate ratio;

(b) measuring system back pressure at the new optimum flow rate ratio; and (c) repeating said recalculating step if there is another variance between the measured system back pressure at the new optimum flow rate ratio with the measured system back pressure at the preliminary optimum flow rate ratio.

19. A method as recited in claim 18 further comprising the step of:

delivering the two-phase fluid flow to the piping system to be cleaned at the optimum flow rate ratio.

* * * * *

UNITED STATES PATENT AND TRADEMARK OFFICE

CERTIFICATE OF CORRECTION

PATENT NO. : 5,941,257

DATED : August 24, 1999

INVENTOR(S) : David W. Gruszczynski, II

It is certified that error appears in the above-identified patent and that said Letters Patent is hereby corrected as shown below:

Column 16, claim 17, line 26. "back pressure of step." should read --back pressure of step (b).--

Signed and Sealed this

Thirtieth Day of May, 2000

Attest:

Q. TODD DICKINSON

Attesting Officer

*Director of Patents and Trademarks*